(12) United States Patent
Narayanan et al.

(10) Patent No.: US 10,725,748 B2
(45) Date of Patent: Jul. 28, 2020

(54) EXTRACTING PROGRAM FEATURES FOR ASSISTING SOFTWARE DEVELOPMENT

(71) Applicant: Microsoft Technology Licensing, LLC, Redmond, WA (US)

(72) Inventors: Srivatsn Narayanan, Bothell, WA (US); Kesavan Shanmugam, Redmond, WA (US); Mark A. Wilson-Thomas, Mercer Island, WA (US); Vivian Julia Lim, Redmond, WA (US); Jonathan Daniel Keech, Kirkland, WA (US); Shengyu Fu, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/195,318

(22) Filed: Nov. 19, 2018

(65) Prior Publication Data

US 2020/0159505 A1 May 21, 2020

(51) Int. Cl.
*G06F 9/44* (2018.01)
*G06F 8/35* (2018.01)
*G06N 20/00* (2019.01)

(52) U.S. Cl.
CPC ............ *G06F 8/35* (2013.01); *G06N 20/00* (2019.01)

(58) Field of Classification Search
CPC .................... G06F 8/35–37; G06F 8/40–41
USPC ................... 717/104–110, 116–120
See application file for complete search history.

(56) References Cited

U.S. PATENT DOCUMENTS

| | | | | |
|---|---|---|---|---|
| 5,875,331 A | * | 2/1999 | Lindsey | G06F 8/10 717/108 |
| 6,826,568 B2 | * | 11/2004 | Bernstein | G06F 16/86 707/749 |
| 7,546,578 B2 | * | 6/2009 | Yang | G06F 8/10 717/108 |
| 7,761,858 B2 | * | 7/2010 | Chang | G06F 8/20 700/246 |
| 7,822,592 B2 | * | 10/2010 | Hawkins | G06Q 99/00 703/17 |
| 7,861,217 B2 | * | 12/2010 | Ciolfi | G06F 30/20 717/105 |
| 7,926,029 B1 | * | 4/2011 | Stoyen | G06F 8/20 706/11 |
| 8,201,139 B2 | * | 6/2012 | Chang | G06F 8/20 704/2 |

(Continued)

OTHER PUBLICATIONS

Shen et al, "A Latent Semantic Model with Convolutional-Pooling Structure for Information Retrieval", ACM, pp. 101-110 (Year: 2014).*

Borisov et al, "Using Metafeatures to Increase the Effectiveness of Latent Semantic Models in Web Search", ACM, pp. 1081-1091 (Year: 2016).*

(Continued)

*Primary Examiner* — Anil Khatri
(74) *Attorney, Agent, or Firm* — Workman Nydegger

(57) ABSTRACT

Improving the results and process of machine learning service in computer program development. A client's codebase is accessed. A set of features are extracted from the client's codebase. One or more features from the set of features are then selected. Thereafter, at least one of the selected features is sent to a machine learning service that uses the received feature(s) to build custom model(s) for the client's computer system.

20 Claims, 10 Drawing Sheets

(56) References Cited

U.S. PATENT DOCUMENTS

| | | | | |
|---|---|---|---|---|
| 8,230,386 | B2* | 7/2012 | Sedukhin | G06F 11/3612 717/100 |
| 8,429,103 | B1* | 4/2013 | Aradhye | G06N 20/00 706/12 |
| 8,484,612 | B2* | 7/2013 | DelloStritto | G16H 40/20 717/106 |
| 8,725,666 | B2* | 5/2014 | Lemmond | G06F 16/3344 706/13 |
| 9,892,208 | B2* | 2/2018 | Anastasakos | G06F 16/951 |
| 9,904,867 | B2* | 2/2018 | Fathi | G06K 9/00201 |
| 9,928,235 | B2* | 3/2018 | Beller | G06F 17/2785 |
| 10,324,961 | B2* | 6/2019 | Chen | G06F 16/9024 |
| 10,387,531 | B1* | 8/2019 | Vanhoucke | G06K 9/6273 |
| 10,402,731 | B1* | 9/2019 | Cosic | G06F 9/451 |
| 10,521,209 | B2* | 12/2019 | Bucuvalas | G06F 8/51 |
| 2014/0237595 | A1 | 8/2014 | Sridhara et al. | |
| 2017/0185921 | A1 | 6/2017 | Zhang | |
| 2018/0275970 | A1 | 9/2018 | Woulfe et al. | |

OTHER PUBLICATIONS

Wojtusiak, "Semantic Data Types in Machine Learning from Healthcare Data", IEEE, pp. 197-202 (Year: 2012).*

Guyer et al, " Broadway: A Compiler for Exploiting theDomain-Specific Semantics of Software Libraries", IEEE, pp. 342-357 (Year: 2005).*

Jovanovic' et al, "Using Semantic Web Technologies to Analyze Learning Content", IEEE, pp. 45-53 (Year: 2007).*

Shehata, "A Word Net-based Semantic Model for Enhancing Text Clustering", IEEE, pp. 477-482 (Year: 2009).*

Parent et al, "Semantic Trajectories Modeling and Analysis", ACM, pp. 1-32 (Year: 2013).*

Ren et al, "Research on Defect Detection Technology of Trusted Behavior Decision Tree Based on Intelligent Data Semantic Analysis of Massive Data", ACM, pp. 168-175 (Year: 2018).*

"International Search Report and Written Opinion Issued in PCT Application No. PCT/US2019/58615", dated Feb. 2, 2020, 26 Pages.

* cited by examiner

EXTRACTING PROGRAM FEATURES FOR ASSISTING SOFTWARE DEVELOPMENT

BACKGROUND

Computers and related technology have impacted many aspects of society. Indeed, a computer's ability to process information and to execute applications has transformed the way we both live and work. A computer operates by executing a set of executable instructions (e.g., source code). These instructions are typically created in a development environment by a code developer who is designing an application. In many instances, the developer will iteratively change the code in an effort to improve the code's execution and to remove any coding bugs or errors.

A computer programming project often comprises a large collection of codebases that make up the project. A "codebase" may include source code, associated databases, test files, and/or metadata such as change history and changes made. Source code contained in a codebase often includes not only source code written by different programmers but also multiple preexisting code libraries. Newly created program instructions merge into a larger codebase, and are then compiled, interpreted, and/or built into executable files and other libraries. A computer then executes the executable files to provide the developed functionalities.

Different tools have been created to assist a developer in writing, editing, testing, and debugging an application's source code. Some of these tools include source code editors, debuggers, and integrated development environments (IDES), just to name a few. In addition to using helpful tools, the process of generating and refining source code can be further improved by receiving suggestions from other entities.

The subject matter claimed herein is not limited to embodiments that solve any disadvantages or that operate only in environments such as those described above. Rather, this background is only provided to illustrate one exemplary technology area where some embodiments described herein may be practice.

BRIEF SUMMARY

At least some embodiments described herein relate to the improved exercise of machine learning in the field of computer program development. This is achieved by accessing a client's codebase, extracting potential features corresponding to aspects of the code which may be required to describe it for modelling purposes. One or more features are then selected to be sent to a machine learning service to allow building of one or more custom learning models.

Existing machine-learning assisted code drafting technologies are often performed with the service provider having direct access to the client's codebases. A client's codebase is often very large, including not only the newly created code for a particular project, but also including several or many prerequisite libraries or other dependencies. In some of these existing technologies, the service provider must create a complete copy of the large collection of data contained in the codebase and update it as the codebase changes, or frequently or continuously access the large collection of data through a network. Furthermore, the client must ensure that all necessary dependencies and configuration required to build their source code are correctly set up on the service in order for feature extraction to work successfully. This is onerous for the client and often prevents clients from completing the configuration process. In addition, such a system is not only burdensome to the service provider, but also places the client's proprietary programs and data at risk. Clients often hesitate to provide complete proprietary codebases to the service provider. Given these problems, model training on client's code proves more difficult to achieve in practice, resulting in less complete models due to incomplete or out of date data.

The present invention solves these problems by allowing clients keep their source code on their own systems and only transmit a limited amount of information (namely, the extracted data features) from the clients' side to the service side. This represents an efficient use of network resources when compared to sending the entire collection of the client's codebase to the service provider. In addition, the extracted data features are much less proprietary (and thus more likely to be shared by the client) than the entire codebase. Thus, the data features can be transmitted through a computer network more quickly and/or stored on the client and/or service provider's system more safely. Furthermore, the client is relieved of the need to configure the service provider's service to build their codebase, and feature extraction is possible solely on the precondition that the client's code builds on their own machine; this is a much simpler requirement for the client and considerably eases the burden of model creation based on their code.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

Figure 1:
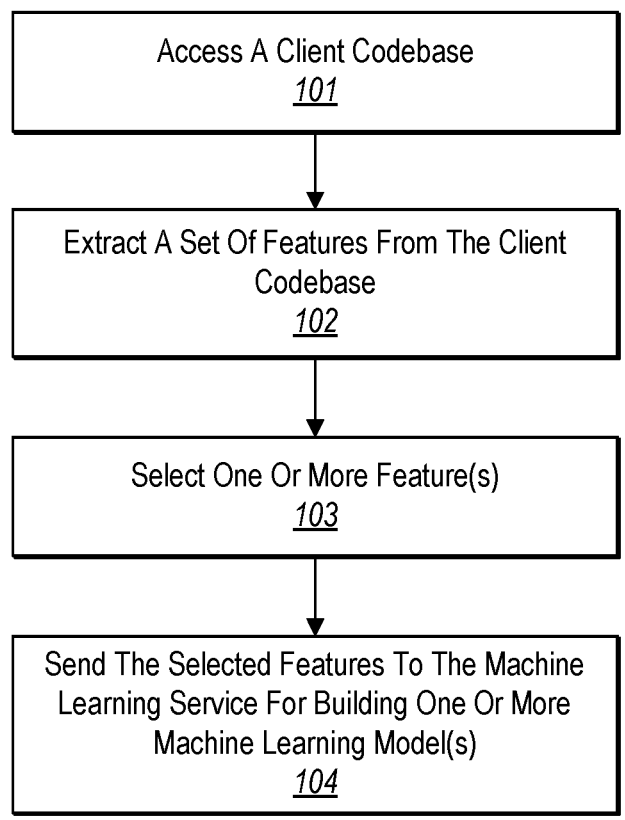
FIG. 1 illustrates a flowchart of a method for extracting data features from a client's codebase for creation of custom models in a service.

At least some embodiments described herein relate to the improved exercise of machine learning in the field of computer program development. This is achieved by accessing a client's codebase, extracting potential features corresponding to aspects of the code which may be required to describe it for modelling purposes. One or more features are then selected to be sent to a machine learning service to allow building of one or more custom learning models. The one or more extracted features are then sent to a machine learning service for building one or more custom machine learning models.

Existing machine-learning assisted code drafting technologies are often performed with the service provider having direct access to the client's codebases. A client's codebase is often very large, including not only the newly created code for a particular project, but also including several or many prerequisite libraries or other dependencies. In some of these existing technologies, the service provider must create a complete copy of the large collection of data contained in the codebase and update it as the codebase changes, or frequently or continuously access the large collection of data through a network. Furthermore, the client must ensure that all necessary dependencies and configuration required to build their source code are correctly set up on the service in order for feature extraction to work successfully. This is onerous for the client and often prevents clients from completing the configuration process. In addition, such a system is not only burdensome to the service provider, but also places the client's proprietary programs and data at risk. Clients often hesitate to provide complete proprietary codebases to the service provider. Given these problems, model training on client's code proves more difficult to achieve in practice, resulting in less complete models due to incomplete or out of date data.

The present invention solves these problems by allowing clients keep their source code on their own systems and only transmit a limited amount of information (namely, the extracted data features) from the clients' side to the service side. This represents an efficient use of network resources when compared to sending the entire collection of the client's codebase to the service provider. In addition, the extracted data features are much less proprietary (and thus more likely to be shared by the client) than the entire codebase. Thus, the data features can be transmitted through a computer network more quickly and/or stored on the client and/or service provider's system more safely. Furthermore, the client is relieved of the need to configure the service provider's service to build their codebase, and feature extraction is possible solely on the precondition that the client's code builds on their own machine; this is a much simpler requirement for the client and considerably eases the burden of model creation based on their code.

This patent application will be organized as follows. First, the principles of extracting feature data from a client's codebase for creation of custom models in a service will be described with respect to FIGS. 1 and 2. An example of featurization model will be described with respect to FIG. 3. Then, different implementations of feature extraction will be described with respect to 4A and 4B. Thereafter, the application of machine learning models built from those extracted features will be described with respect to FIGS. 5 through 6B. Thereafter, an example of the re-featurization model will be described with respect to FIG. 7. Finally, because the principles described herein operate in the context of a computer system, a computer system will be described with respect to FIG. 8.

Figure 2:
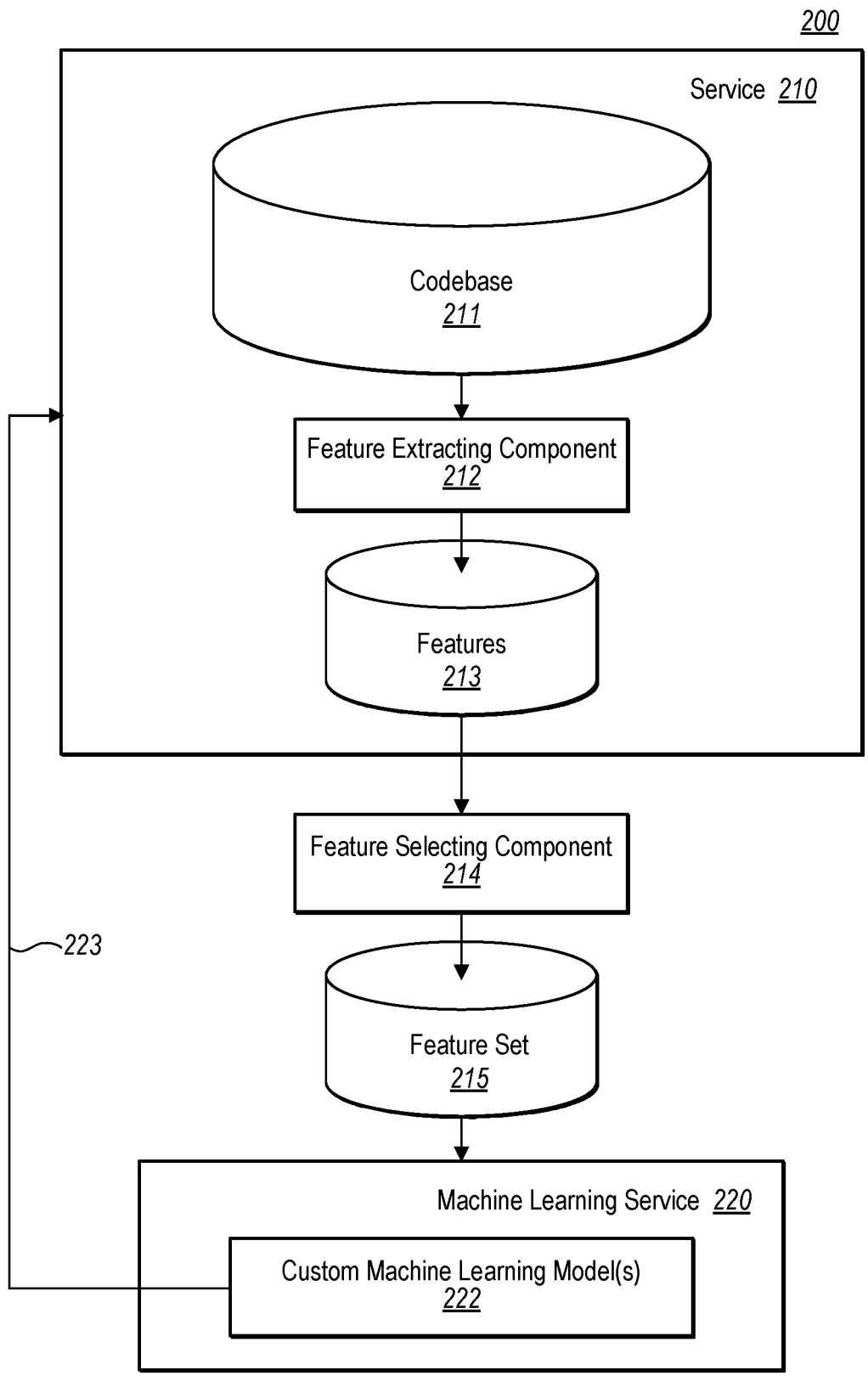
FIG. 2 illustrates an environment in which the method illustrated in FIG. 1 may be implemented.

FIG. 1 illustrates a flowchart of method 100 for extracting feature data from a client's codebase for creation of custom machine learning models. FIG. 2 illustrates an environment 200 in which the method 100 may be implemented. Important benefits are derived from the fact that a client's codebase can be enormous and contain highly sensitive information. On the other hand, data features of the client's codebase are much smaller, and often contain less sensitive information. Since FIGS. 1 and 2 are closely related to each other, FIGS. 1 and 2 now will be described together.

Referring to FIG. 1, the method 100 includes accessing a client codebase (act 101). The client system then extracts the feature data of the corresponding codebase. Next, one or more features are selected (act 103) from the feature data generated via act 102. The selected features are then sent (act 104) to a machine learning service for building one or more machine learning models.

A "codebase" may include source code, associated databases, configuration and property files, test files, and/or metadata such as change history and changes made during software development. In software development, the whole collection of source code that is used to build a particular software system, application, or software component is often included in the codebase. Multiple projects can have separate distinct codebases, or can have a single, shared or monolithic codebases. In particular, related projects, such as those developed within the same company, often share the same codebase. As such, the codebase can grow to a size that is too large to efficiently transmit via computer networks.

The client codebase may be a proprietary codebase or a public (e.g., open source) codebase. In this application, the client codebase is mostly referred to a client's proprietary codebase. A model generated based on a client's proprietary codebase is often called a "custom model". The same principles described herein may also be used to generate models based on public codebases. A model generated based on a public codebase is often called a "base model". A same client may have a codebase that is made available for public access and a codebase that is proprietary. Accordingly, a base model may be built based on the public accessible codebase, and a custom model may be built based on the proprietary codebase. The base model may be made available to public for free access, and the custom model may be kept as a proprietary model.

Referring to FIG. 2, the environment 200 includes a client computer system 210 (hereinafter also being sometimes referred to as "client system" or "client") and a machine learning service computer system 220 (hereinafter also being sometimes referred to as "service system"). Each of the client system 210 and the service system 220 may be structured as described before for the computing system 800 of FIG. 8.

As illustrated in FIG. 2, the client system 210 includes a client codebase 211 (hereinafter may also be referred to as "codebase") and a feature extracting component 212. The client system 210 has access to the codebase 211 (referring to act 101 in FIG. 1). The feature extracting component 212 extracts feature data from the codebase 211 to generate a set of feature data 213 on the client system (act 102 in FIG. 1). The set of features 213 is then fed into the feature selecting component 214. The feature extracting component 212 selects a subset of the features (act 103 in FIG. 1) and sends at least one of the selected features to the machine learning service for building one or more machine learning models (act 104 in FIG. 1).

Figure 8:
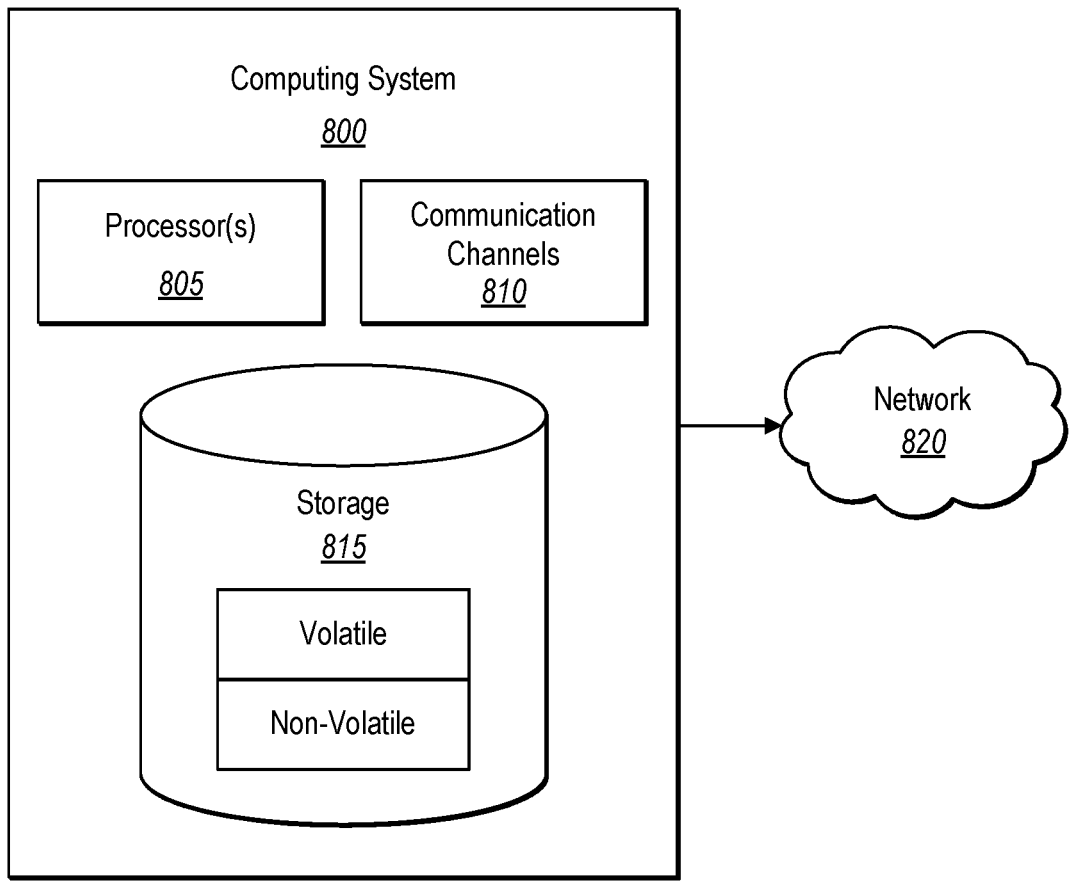
FIG. 8 illustrates an example computer system in which the principles described herein may be implemented.

If the client system 210 is implemented as described for the computing system 800 of FIG. 8, the feature extracting component 212 and the feature selecting component 214 may be an executable component running on that computing system 800. However, the feature selecting component 214 is shown outside of the client system 210 in order to symbolically represent that the feature selecting component 214 may be partially or fully implemented outside of the client system 210. Further details regarding the feature selecting component 214 are described in FIGS. 4A, 4B.

Traditionally, to build custom machine learning models for such a large codebase requires the machine learning service to have complete access to the codebase. Typically, the client often provides access to their complete code repository to the service provider. This approach is burdensome to both the client and the service provider.

For example, from the client perspective, there is a potential privacy risk when a customer discloses their complete codebase to the service provider. Because of this privacy risk, customers may choose to provide only a partial codebase to the service provider. This reduces the quality of the machine learning model because it cannot leverage information in the entirety of the codebase. In addition, it takes substantial time to transfer an entire codebase over a network.

The principles described herein allow a service provider to customize generated machine learning models on a per-client basis. As illustrated in FIGS. 1 and 2, method 100 allows the large client codebase 211 to be processed through the feature extracting component 212 on the client system 210 to generate a set of feature data 213. As shown in FIG. 2, the data features 213 (which is symbolically represented as a large volume) are much smaller compared to the complete codebase 211 (which is symbolically represented as a small volume). Furthermore, the data feature set 215 is a subset of the complete data features 213, as symbolized by the volume of the data feature set being even smaller. It is much more efficient to transfer such a small data feature set 215 over a network and also presents a reduced risk of leakage of private concepts in the clients' source code.

On the service provider side, the service provider 220 receives the data feature set 215, and generates one or more custom machine learning models using the data feature set 215. The arrow 223 represents that these custom machine learning model(s) 222 are then "applied back" to the client's programming environment. More details regarding how the machine learning models 222 are "applied back" to the client computing system 110 are described further below with respect to FIGS. 6A through 6C.

Figure 3:
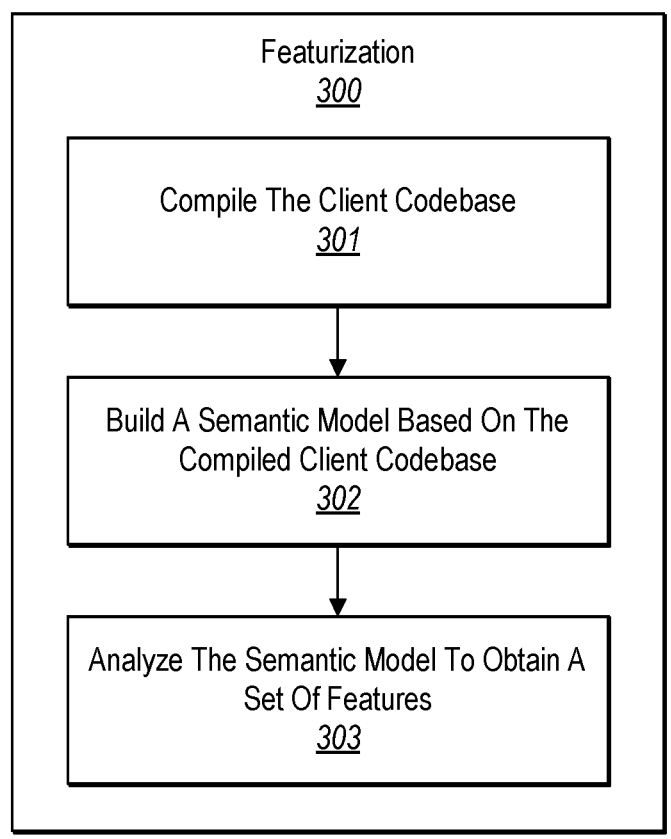
FIG. 3 illustrates a flowchart of a method for featurizing a client codebase on a client computer system to generate a set of data features corresponding to the client codebase.

Now, an example of an operation of the feature extracting component 212 will be described with respect to FIG. 3. FIG. 3 illustrates a flowchart of a method 300 for featurizing the client codebase on the client computer system to generate a set of data features corresponding to the client codebase. Method 300 is an example of how act 102 of FIG. 1 may be performed.

Briefly stated, the client codebase is first interpreted by a compiler (act 301). The compiled codebase is then used to build a semantic model (act 302). A semantic model is a model providing information about the semantic meaning of a program. Many different types of information may be queried through the semantic model. For example, a semantic model can answer questions like what members are accessible from a particular method, what variables are used in a particular block of text, what a name or expression refers to, and so forth. This may also be performed by the compiler during a normal compilation process.

The semantic model often includes many features of the codebase. A feature may be a symbol or element declared by the source code contained in the codebase, information obtained from metadata of the codebase, errors, or warnings generated from diagnostics tools contained in or linked to the codebase. For example, a feature may be a namespace of an object, a data type, a method, a property, a field, an event, a parameter, a local variable, and so forth. Many data features contained in the semantic model are directly or indirectly relevant to the machine learning models to be built. Therefore, the semantic model is then analyzed to obtain a set of data features (e.g., set of features 213 of FIG. 2) (act 303).

Because each codebase includes its own distinct objects, data types, methods, and so forth, the data feature set generated from one codebase is distinct from that generated from another codebase. Furthermore, the format of data features for different codebases may also be different, because each codebase may include source code written in different programming languages. Since each programming language has its own syntax, standards and/or implementation, the semantic models built for codebases may be different per programming language. Accordingly, the feature set generated from these different types of semantic models will also be in a different format. For example, a data feature set generated from a Java codebase would be very different from a feature set generated from a C++ codebase.

Even though different types of codebases may generate different types of feature sets, a feature set is often much smaller in volume compared to the entirety of the codebase. This is often because a feature set does not contain all the sensitive information included in the entirety of the codebase. However, even when the complete set of data features is much smaller in size compared to the entirety of the codebase, not every feature is necessary or desirable to use in building a machine learning model. For instance, some features may not have material predictive value in the machine learning model at hand. Therefore, the complete feature set 213 may be further processed to extract a smaller set of data features 215 through the feature selecting component 214 (act 103 of FIG. 1). The smaller set of features 215 is more informative and compact than the complete data feature set 213.

As mentioned previously, the feature selecting component 214 is shown outside of the client system 210 in order to symbolically represent that the feature selecting component 214 may be partially or fully implemented outside of the client system 210. Different implementations of feature extraction will now be described with respect to FIGS. 4A and 4B.

Figure 4A:
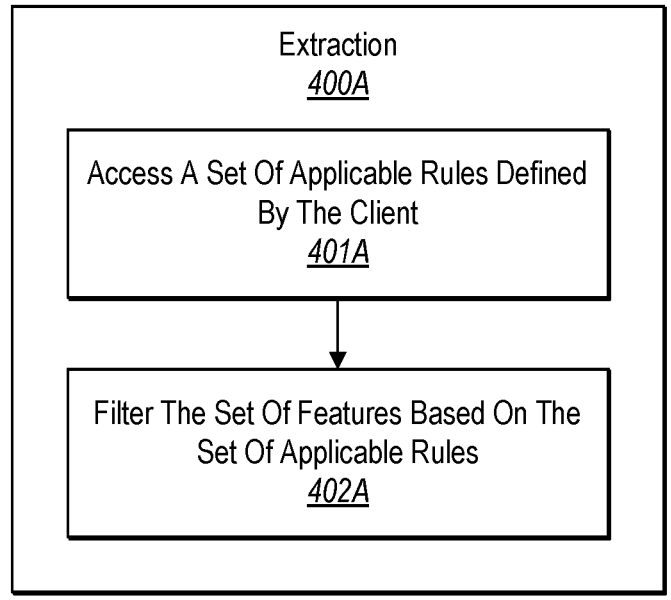
FIG. 4A illustrates a flowchart of method for extracting one or more features from a set of data features in which a set of extraction rules is defined by a client computer system.
Figure 4B:
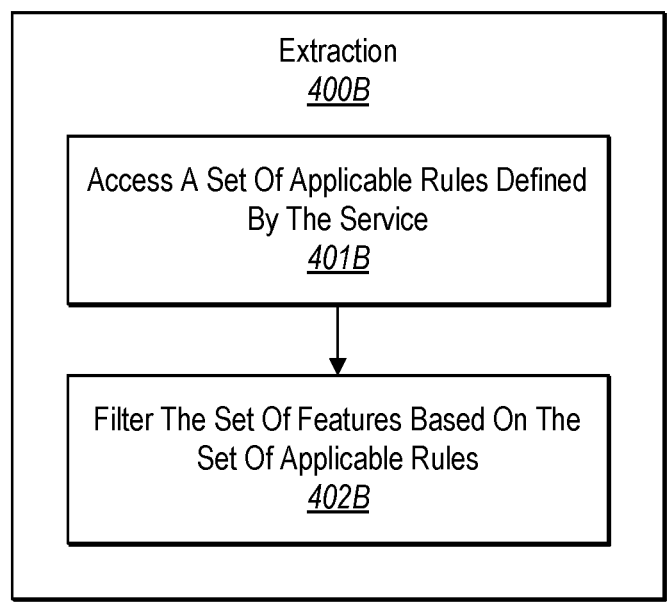
FIG. 4B illustrates a flowchart of method for extracting one or more features from a set of data features in which a set of extraction rules is defined by a machine learning service.

FIGS. 4A and 4B illustrate two different embodiments of the operation of a feature selecting component 214. FIG. 4A illustrates a flowchart of a method 400A for extracting one or more features from a set of data features in which a set of extraction rules is defined by a client computer system (e.g., client system 210 of FIG. 2). FIG. 4B illustrates a flowchart of a method 400B for extracting one or more features from a set of data features in which a set of extraction rules is defined by a machine learning service (e.g., service system 220 of FIG. 2). Method 400A or 400B is an example of how act 103 of FIG. 1 may be performed.

Referring to FIG. 4A, the client system (e.g., client system 210 of FIG. 2) defines a set of applicable rules. The set of applicable rules defined by the client system (e.g., 210 of FIG. 2) is first accessed (act 401A). The set of features (e.g., 213 of FIG. 2) is then filtered based on this set of applicable rules to generate a filtered feature set (e.g., features set 215 of FIG. 2) (act 401B). The principles described in method 400A allows the client to define what features are relevant to the target machine learning model. The client also can control the amount of information to be disclosed to the service system, thereby controlling privacy. Even though client data features are less sensitive compared to the entirety of the codebase, certain data features may still contain proprietary information. The principles described herein gives the client more control over its own data and codebase for protecting its own privacy and proprietary information.

Referring to FIG. 4B, unlike FIG. 4A, the service system (e.g., service system 220 of FIG. 2) defines a set of applicable rules. The set of applicable rules defined by the service system is then accessed (act 401B). The set of features (e.g., feature set 213 of FIG. 2) is then filtered based on the set of applicable rules defined by the service system to generate the filtered feature set (e.g., filtered feature set 215 of FIG. 2) (act 402B). The principles described in method 400B allows the service to define what features are necessary for building the target machine learning model(s).

The client may receive and access a set of rules defined by the service system (act of 401A of FIG. 4) and apply the set of rules received from the service system to the initial features set 213 to generate the filtered feature set 215 (act of 402A of FIG. 4A). Thereafter, the filtered feature set are sent from the client system to the service system (act 104 of FIG. 1). Alternatively, the client may send the initial feature set 213 to the service system. Then, the service system will access (act 102 of FIG. 1) the initial feature set from the client (act 102 of FIG. 1), access the rules defined by the service system (act of 401B of FIG. 4) and filter the complete feature set based on its own rules (act of 402B of FIG. 4).

The service provider's filter may be based on the particular types of models that are to be built, the accuracy and speed requirements set by the parties, the limitations due to the available physical resources and/or the speed of the computer network, or the privacy and/or security related factors. Since at least some of the features will be transmitted from the client system to the service system, reducing the size of the necessary set of features improves the efficiency and accuracy of the machine learning models built by the service system. Thus, transmitting only the filtered feature set 215 improves the efficiency and accuracy of the machine learning models.

In some embodiments, both client and the service provider may apply a filter to extract features. For instance, a client may perform first stage filtering of the initial feature set. In a second stage, the service may further filter the feature set to generate the final filtered feature set that is to be used to generate machine learning models. Alternatively, a client-defined filter and a service-defined filter may be aggregated first, then be applied to the complete initial features set to generate the filtered feature set 215.

After the filtered feature set 215 is accessed by the service system, the service system uses that filtered feature set 215 to generate one or more machine learning model(s) (e.g., machine learning model(s) 222 of FIG. 2) that is customized to the client codebase. The custom machine learning models are then sent (e.g., represented by the arrow 223 of FIG. 2) back to the client system to be applied to a client programming environment. Accordingly, the client system receives the custom machine learning models from the service system.

Figure 5:
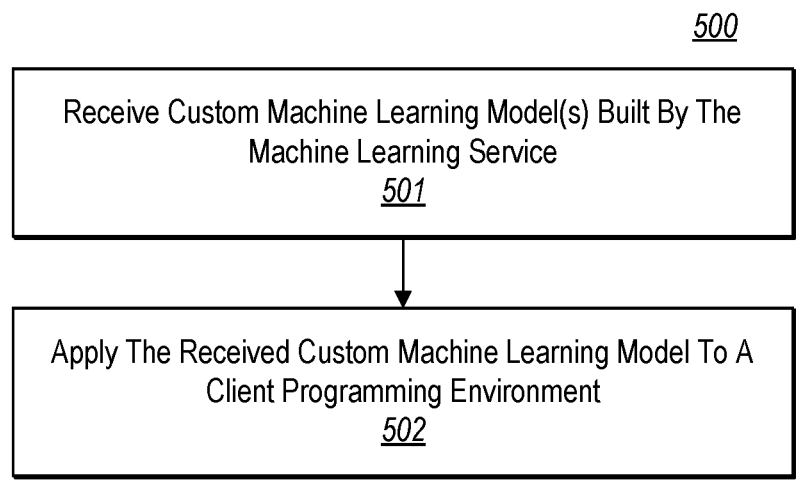
FIG. 5 illustrates a flowchart of method for receiving and applying the custom machine learning model to the client programming environment.

FIG. 5 illustrates a flow chart of a method 500 for receiving and applying the custom machine learning models to a client programming environment. A programming environment is a collection of components located on the client system. The programming environment may include language specific editors, debugging facilities, and/or any other hardware and software used by a programmer on the client system who may access the client codebase (e.g., codebase 211 of FIG. 2).

Referring to FIG. 5, after the custom machine learning model is built by the machine learning service provider, the client system receives the custom machine learning model(s) (e.g., custom machine learning model(s) 222 of FIG. 2) from the service provider (act 501 of FIG. 5). The custom machine learning model(s) are then applied to a programming environment on the client system (act 502 of FIG. 5).

Each of the custom machine learning model(s) is generally built for some particular purpose. A model may be built for example, for predicting an API, detecting variable misuses, autocompleting a portion of the source code, and so forth. When a particular model is applied to the programming environment on the client system, the effect is that the client's programming tools or IDE will surface the results of that model in some appropriate user interface to allow the programmer to make use of them. This will help the computer programmer more efficiently contribute to the programming project.

For example, if a model is for predicting the API(s) that the programming project is likely to invoke, when the model is applied to the programming environment, the system may predict such APIs and display the predicted API(s) on a visualization in the programming environment. As such, the computer programmer does not have to look up the API in a programming guide. After all, since there are so many APIs and methods in the codebase, it is almost impossible for any programmer to remember all of them, and picking the right one in a given context requires a lot of work, which the machine learning model can assist with. This also prevents typographical errors in manually typing the API. Having the machine learning model predict and recommend APIs can increase the efficiency of computer programming.

Figure 6A:
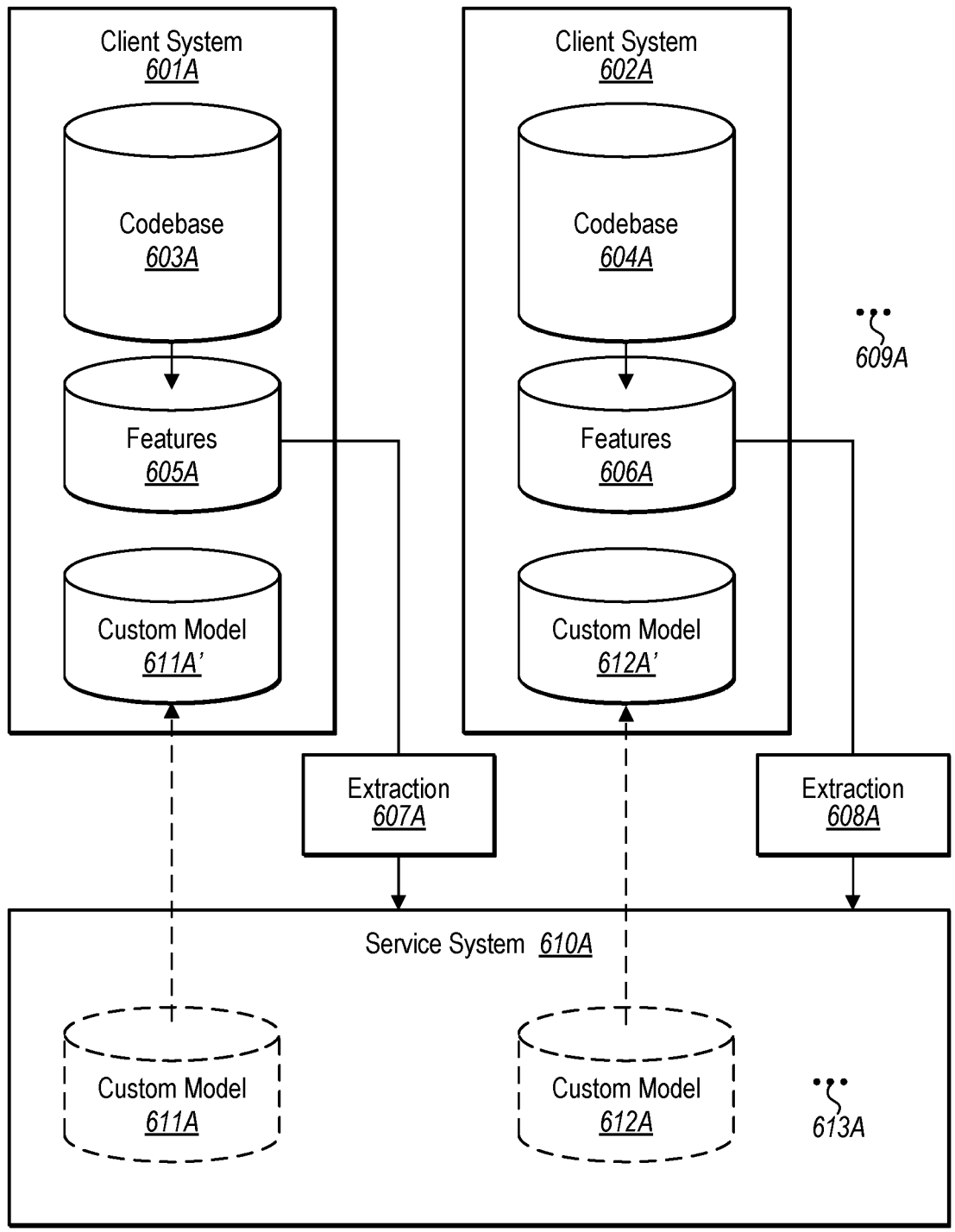
FIG. 6A illustrates an environment in which the method for extracting one or more features from a set of data features may be implemented, and in which a respective custom model is sent to both client computer systems.
Figure 6B:
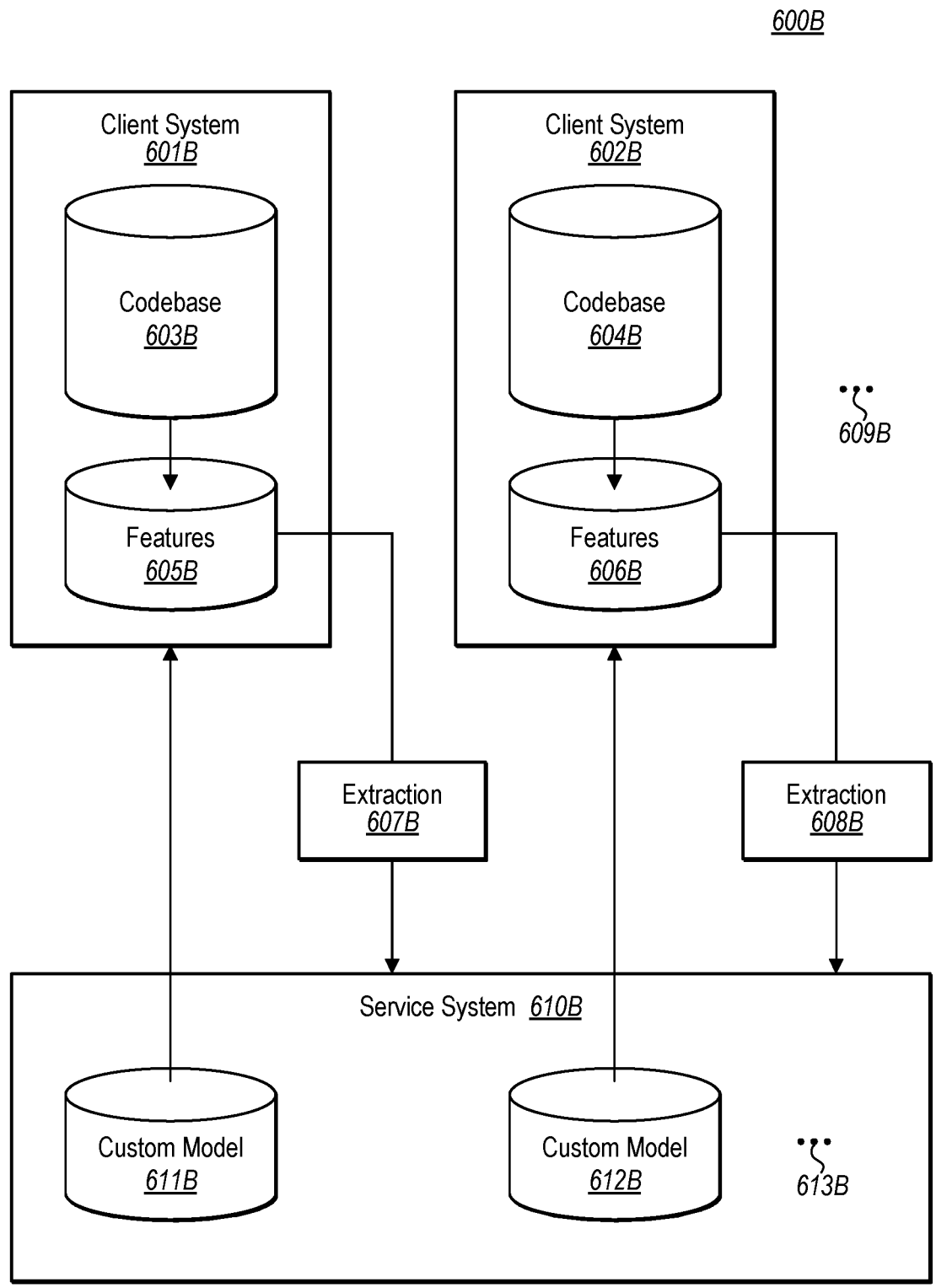
FIG. 6B illustrates an environment that is similar to that of FIG. 6A, except that custom models are kept at the service system.
Figure 6C:
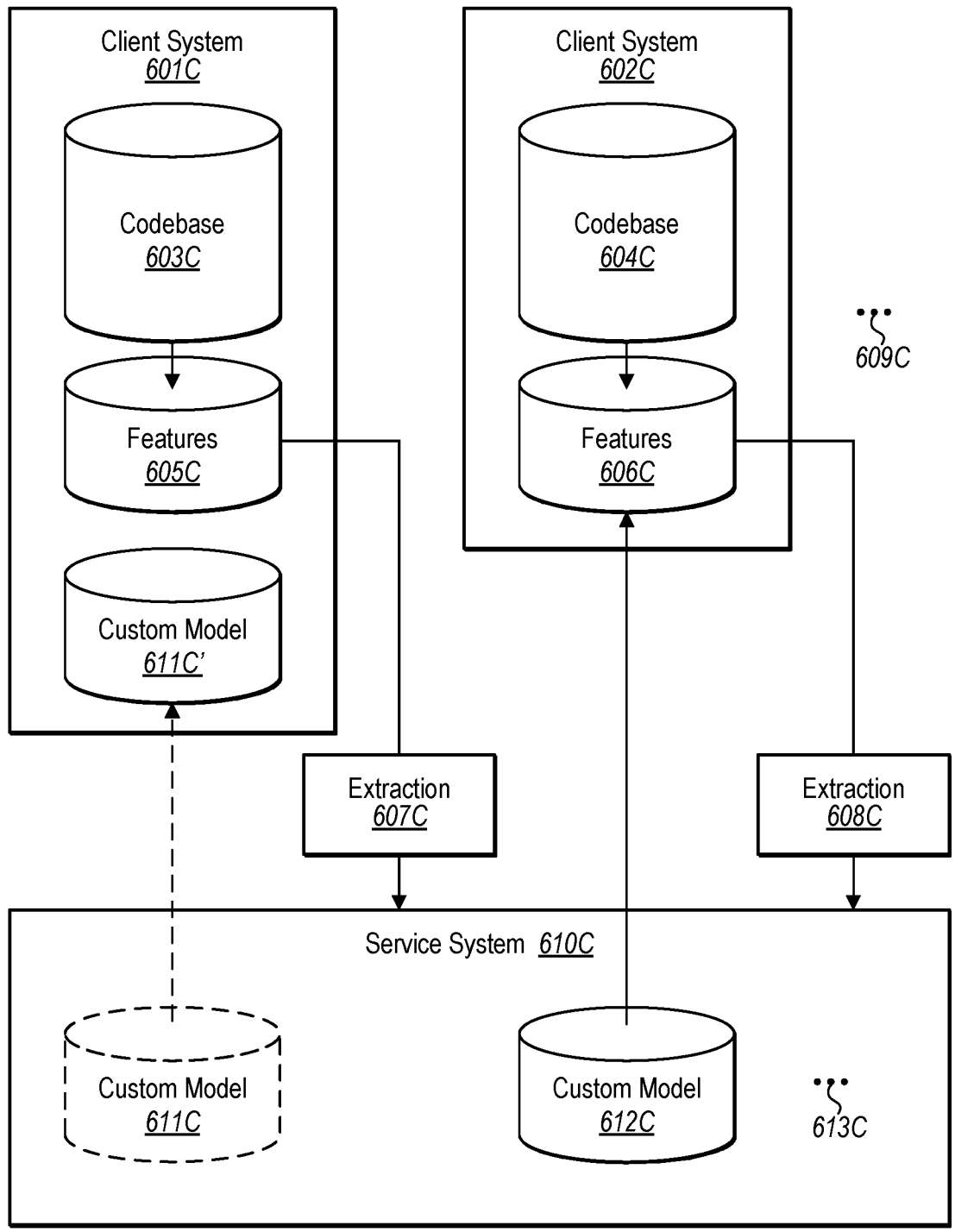
FIG. 6C illustrates an environment that is a combination of FIGS. 6A and 6B, in that the custom model is sent to one of the client computer system, while the other custom model is kept at the service system.

Different implementations may be implemented for the client to receive (act 501 of FIG. 5) and/or apply (act 502 of FIG. 5) the custom machine learning model(s) built by the service provider. In some embodiments, as described above, the service provider may send a complete copy of the custom machine learning models to the client. Then, the client system may run and apply the machine learning models on the client system itself. On the other hand, the service provider can keep control of the custom machine learning models and only allow the client to execute the models via a computer network. FIGS. 6A, 6B and 6C illustrates the environments 600A, 600B and 600C in which the above-mentioned embodiments may be implemented.

FIG. 6A illustrates an environment 600A in which the method for extracting one or more features from a set of data features may be implemented, and in which a respective custom model is sent to both client computer systems. Referring to FIG. 6A, there are at least two client systems 601A, 602A and a machine learning service system 610A. The ellipsis 609A represents that the total number of client systems may be any natural number. The service system 610A represents a machine learning service provider that providing services to the client systems 601A and 602A, and is an example of the machine learning service system 220 of FIG. 2. Client system 601A contains a codebase 603A, and is an example of the client system 210 of FIG. 2. Based on the codebase 603A, the client system 601A generates an initial feature set 605A, from which the extraction component 607A generates a filtered feature set provided to the service provider's system 610A. Similarly, the client system 602A contains a codebase 604A. Based on the codebase 604A, the client system 602A generates an initial feature set 606A, from which the extraction component 608A generates a filtered feature set also provided to the service provider's system 610A.

After receiving at least one of the filtered features from the client system 601A, the service system 610A generates a custom model 611A for the client system 601A. Also, after receiving at least one of the filtered features from the client system 602A, the service system 610A generates a custom model 612A for the client system 601A. The ellipsis 613A represents that there may be any natural number of custom machine learning models being built, one of which is corresponding to one of the client systems.

As illustrated in FIG. 6A, the complete custom models 611A and 612A are sent back to the respective client systems 601A and 602A. Further, each of the client systems 601A and 602A stores a copy of the custom models as 611A' and 612A', respectively. The custom models 611A and 612A are drawn in dotted line form, which means that after sending the custom models 611A and 612A to the client systems 601A and 602A, the service system may perhaps also keep a copy of these custom models. The machine learning service may allow the client to determine whether a copy of the custom model built for the system of the particular client should be kept on the service system 610A.

This embodiment allows clients to have control of the models built from and for their own codebase. The application of the models will be local on the client system, thus, providing faster applications after receiving models. However, it is hard for the service providers to modify the models once built.

FIG. 6B illustrates another embodiment 600B in which the service provider retains the control of the custom models built for each of their clients. Referring to FIG. 6B, similar to FIG. 6A, there are two client systems 601B and 602B. The ellipsis 609B represents that there may be any natural number of client systems for which the service system 610B provides machine learning services. Each of the client systems 601B and 602B contain a codebase 603B and 604B, respectively. Client-specific data features 605B and 606B are generated from each of the corresponding codebases 603B and 604B on each of the corresponding client system 601B and 602B. The client-specific data features 605B and 606B are then filtered through their corresponding extraction component 607B and 608B to generate a respective filtered features.

Also similar to FIG. 6A, the service system 610B receives one or more features from each of the client systems 601B and 602B, then builds a custom model 611B and 612B for each of the client system 601B and 602B. However, unlike FIG. 6A, the service system 610B retains control of the custom models 611B and 612B built for each of the client systems, but grant access to each of the client systems 601B and 602B. For example, the client system 601B has network access to the custom model 611B built from and for its codebase 603B. Similarly, client system 602B has network access to the custom model 612B built from and for its codebase 603B. However, the client systems 601B and 602B do not have a complete copy of the custom models built for their codebases. The arrow lines between the custom models 611B, 612B and the client systems 601B, 602B represent that to access the custom models 611B, 612B, each of the client systems 601B, 602B communicates with the service system 610B whenever the client models 611B, 612B are to be applied.

This implementation gives the service provider more control, and also allows a cloud-based machine learning model application to be provided to the clients. In particular, certain services are inherently done in the cloud. For example, code review management is often done in the cloud. If the model can be used to flag issues in code reviews, keeping the model on the service side would allow the machine learning model to be integrated with the code review management on the service side and provide clients better and integrated cloud services. Additionally, the client may be a distributed computer system, containing computers in different network, or an employee may work from home and only have partial data in his/her home computer. Having the custom models and applications provided on the service system would make for easier access to the models from disparate locations.

FIG. 6C is a combination of FIGS. 6A and 6B. A machine learning service provider may provide both implementations illustrated in FIGS. 6A and 6B. For example, in FIG. 6C, the client system 601C is provided a complete copy 611C' of the custom model 611C, and the client system 602C is provided a cloud-based custom model 612C. This embodiment allows the service provider to provide different types of services. Also, the clients can choose different services based on their wants. Elements 603C through 608C may be similar to respective elements 603B through 608B described with respect to FIG. 6B There are many different machine learning models that may be built by the service system to achieve different purposes. In some embodiments, in response to the application of the received custom machine learning model to the client programming environment, computer-readable or human-readable predictions of a programming utility of the client programming environment may be generated. In particular, a number of programming options may be generated based on prediction of the client's programming needs. Additionally, based on the prediction of the programming utility, a portion of source code may be automatically generated or completed.

For example, in a client programming environment, if the custom machine learning model predicts possible completions, the predicted source code may be presented, via an autocompletion model, as a computer programmer types. If the programmer continues typing characters, the list of members (variables, methods, etc.) is filtered to include only members containing the additionally typed characters. The custom machine learning model may provide different types of suggestions, such as inferred proposals and the global identifiers of the project. Different suggestions may be provided in different fonts or formats.

In some embodiments, in response to the application of the received custom machine learning models to the client's programming environment, one or more possible code misuses within the client programming environment may be detected. In particular, in response to the detection of possible code misuse, a possible solution to correct at least one of the detected possible code misuses may be recommended to the client. Alternatively, the misuse may be automatically corrected.

For example, the custom machine learning model can spot different potential errors including, but not limited to, irregular patterns, missed refactorings, and variable misuse issues. The errors may be detected while the program is typing a new line of code, or via scanning a completed section of code. The detected errors may be shown in different fonts or as a pop-up alert. For obvious errors, the computer system may simply autocorrect them. The users could also preset certain settings of the machine learning model application. If the user prefers to receive a list of suggestions for correcting any the potential error, he/she may set the setting to only allow suggestions be provided. Alternatively, if the user prefers the obvious errors be auto-corrected, he/she may set the setting to allow autocorrect application.

Codebases may change and evolve as new source code is written and included in it. As such, the existing machine learning models may gradually become less accurate in predicting the utility of the programming. Eventually, a new model should be built based on the updated codebase. There may be any a number of events that may trigger the systems to build a new model. Each clients or service provider may manually trigger a refresh operation on any of the steps involved in the model building process illustrated in FIGS. 1 through 5. Also, each of the steps may include a number of events that may automatically trigger each of these steps refresh operation. Once one of these events occurs, the corresponding action will be reinitiated and the previous act's result may be discarded or stored as a history file.

Figure 7:
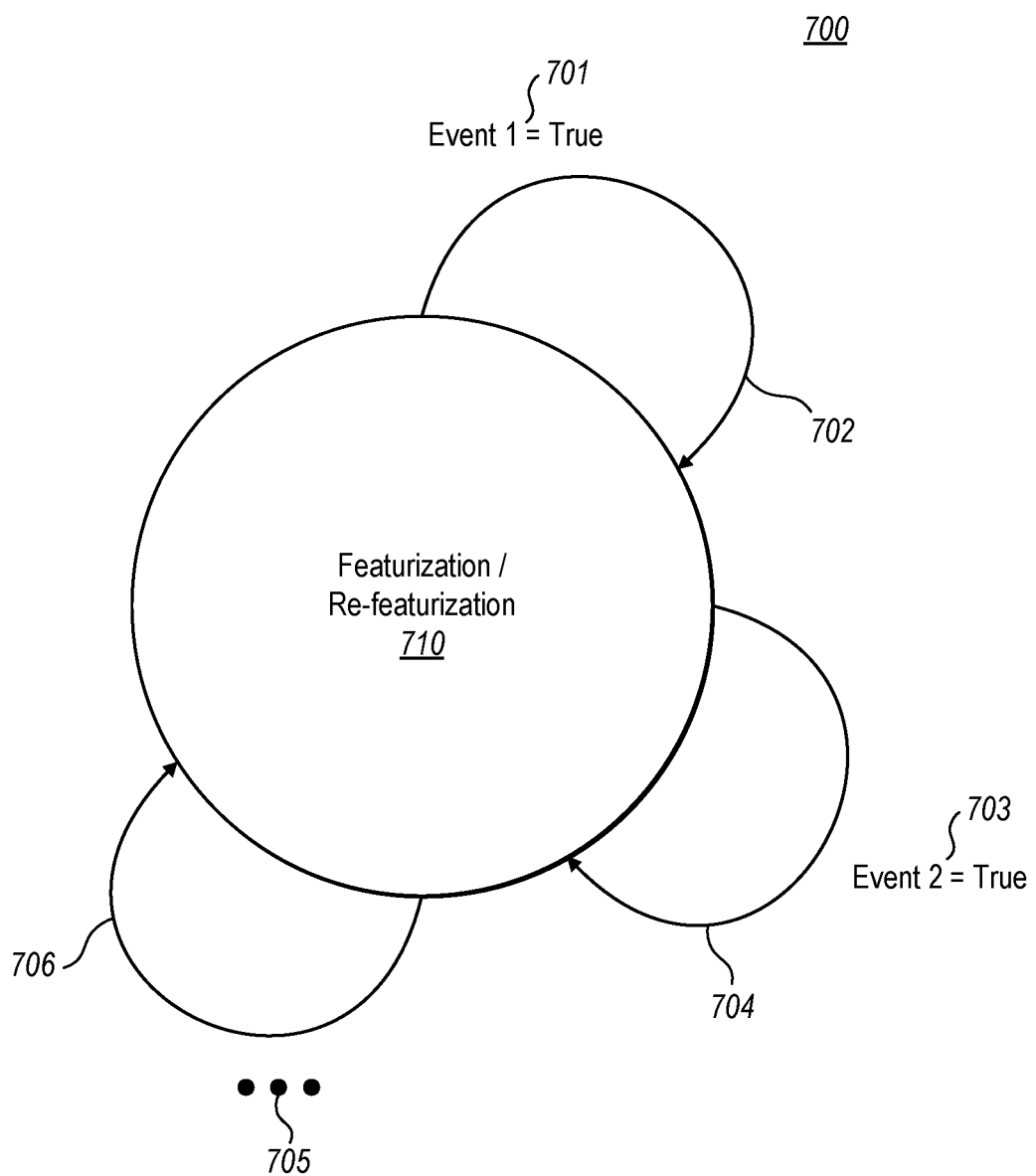
FIG. 7 illustrates a state graph of the featurization model in accordance with an embodiment of the principles describes herein.

In particular, a re-featurization may be triggered manually or automatically. FIG. 7 illustrates a state graph 700 of the featurization (re-featurization) model. The circle 710 represents the act of featurization (or re-featurization). There are one or more triggering events 701 and 703. The ellipsis 705 represents that there may be any natural number of triggering events that may trigger a re-featurization. The arrows 702, 703 and 706 represent that when each of the triggering event 701, 703, 705 is true, a corresponding re-featurization will be initiated. Similarly, each of the steps illustrated in FIGS. 1 through 5 may be refreshed by one or more events also, just like the act of featurization or re-featurization.

The triggering events may include some events happening on the client system, and/or some events happening on the service system. For example, if the size of the codebase has increased by certain volume (e.g., 200 MB) or by certain percentage (e.g., 5%), a re-featurization may be triggered. As another example, if the machine learning service provider has developed a new machine learning program or an improved process of creating models, the machine learning service provider may trigger a new re-featurization. The client may grant permission for the service provider to trigger a re-featurization. Alternatively, the service provider may provide an indication that a re-featurization is recommended, and it is then up to the client to initiate the re-featurization process.

Additionally, some events may be party neutral, such as a time limit. Either party may set a time limit or an expiration date for the existing model. Thus, when time is up, a re-featurization is initiated automatically. The re-featurization frequency may also be determined based on the service plan a client chooses. In some embodiments, a re-featurization may not have to trigger a new model building process. If the newly obtained feature set is similar to the previous version of the feature set, a new model may not be necessary. A difference threshold may be set to determine at what point a new model should be built based on the new feature set.

In addition to allow the client and service to protect each other's proprietary information, performing the featurization and re-featurization on the client's system also reduces the resource consumption on the service side. Since featurization process require analyzing and compiling the complete large codebase, the process is both time consuming and resource consuming. As such, it is further advantageous to the machine learning service providers to allow the featurization and re-featurization to be completely on the client systems.

Finally, because the principles described herein operate in the context of a computer system, a computer system will be described with respect to FIG. 8. As illustrated in FIG. 8, in its most basic configuration, a computer system 800 includes various different components. As used herein, "computer system" and simply "computer" are synonymous terms that may be interchanged with each other. FIG. 8 also shows that computer system 800 includes at least one hardware processing unit 805 (aka a "processor"), communication channel(s) 810, and storage 815.

The storage 815 may be physical system memory, which may be volatile, non-volatile, or some combination of the two. Accordingly, the storage 815 may be referred to as a "hardware storage device" on which computer-executable instructions are stored. The term "memory" may also be used herein to refer to non-volatile mass storage such as physical storage media.

If the computer system 800 is distributed, the processing, memory, and/or storage capability may be distributed as well. As used herein, the term "executable module," "executable component," or even "component" can refer to software objects, routines, or methods that may be executed on the computer system 800. The different components, modules, engines, and services described herein may be implemented as objects or processors that execute on the computer system 800 (e.g. as separate threads).

The disclosed embodiments may comprise or utilize a special-purpose or general-purpose computer including computer hardware, such as, for example, one or more processors (such as hardware processing unit 805) and system memory (such as storage 815), as discussed in greater detail below. Embodiments also include physical and other computer-readable media for carrying or storing computer-executable instructions and/or data structures.

Such computer-readable media can be any available media that can be accessed by a general-purpose or special-purpose computer system. Computer-readable media that store computer-executable instructions in the form of data are physical computer storage media. Computer-readable media that carry computer-executable instructions are transmission media. Thus, by way of example and not limitation, the current embodiments can comprise at least two distinctly different kinds of computer-readable media: computer storage media and transmission media.

Computer storage media are hardware/physical storage devices, such as RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

The computer system 800 may also be connected (via a wired or wireless connection) to external sensors (e.g., data acquisition devices). Further, the computer system 800 may also be connected through one or more wired or wireless networks 820 to remote systems(s) that are configured to perform any of the processing described with regard to computer system 800.

A "network," like the network 820 shown in FIG. 8, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. As illustrated, the computer system 800 includes one or more communication channel(s) 810 (e.g., TCP ports, UDP ports, etc.) that are used to communicate with the network 820.

Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, cloud-based machines and infrastructures, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

Additionally or alternatively, the functionality described herein can be performed, at least in part, by one or more hardware logic components. For example, and without limitation, illustrative types of hardware logic components that can be used include Field-Programmable Gate Arrays (FPGAs), Program-Specific or Application-Specific Integrated Circuits (ASICs), Program-Specific Standard Products (ASSPs), System-On-A-Chip Systems (SOCs), Complex Programmable Logic Devices (CPLDs), Central Processing Units (CPUs), and other types of programmable hardware.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
    one or more processors; and
    one or more computer-readable media having stored thereon computer-executable instructions that are structured such that, when executed by the one or more processors, cause the computer system to perform the following:
        communicate via a computer network with a client system that has access to a client codebase;
        cause the client system to extract a set of features from the client codebase, extracting the set of features comprising:
            compiling the client codebase;
            building a semantic model based on the compiled client codebase; and
            analyzing the semantic model to obtain the set of features;
        select one or more features from the set of features based on one or more rules defined by a client associated with the client codebase;
        receive at least one of the selected features from the client system via the computer network;
        based on the received features, build one or more custom machine learning models that are tailored to the client codebase, such that the one or more custom machine learning models are built without having to have direct access to the client codebase; and
        send the one or more custom machine learning models to the client system via the computer network.

2. The computer system of claim 1, wherein the semantic model is built using at least some metadata of the client codebase.

3. The computer system of claim 1, the selection of one or more features comprising:
    accessing a set of applicable rules defined by the client associated with the client codebase; and
    filtering the set of features based on the set of applicable rules defined by the client to extract the one or more features.

4. The computer system of claim 1, the selection of one or more features comprising:

accessing a set of applicable rules defined by at least one of the machine learning models provided by a machine learning service; and filtering the set of features based on the set of applicable rules to extract the one or more features.

5. The computer system of claim 1, wherein the at least one of the one or more custom machine learning models is sent from a machine learning service to the client computer system.

6. The computer system of claim 1, wherein the at least one of the one or more custom machine learning models is stored at a machine learning service and made accessible to the client.

7. The computer system of claim 1, the computer system further caused to perform the following:
receive a custom machine learning model built by the machine learning service in response to sending the at least one of the selected features to the machine learning service; and
apply the received custom machine learning model to a client programming environment of the client computer system.

8. The computer system of claim 7, the computer system further caused to:
in response to the applying the received custom machine learning model to the client programming environment, generate a computer-readable prediction of a programming utility of the client programming environment.

9. The computer system of claim 8, the computer system further caused to:
generate a computer-readable suggestion of a number of programming options to the client's system based on the prediction of a client's programming needs.

10. The computer system of claim 8, the computer system further caused to:
automatically complete a portion of source code based on the prediction of the programming utility.

11. The computer system of claim 7, the computer system further caused to:
in response to the applying the received custom machine learning models to the client's programming environment, detect one or more possible code misuses within the client programming environment.

12. The computer system of claim 11, the computer system further caused to:
in response to the detection of possible code misuse, the computer system recommend a correction to the client to correct at least one of the detected one or more possible code misuses.

13. The computer system of claim 11, the computer system further caused to:
in response to the detection of possible code misuse, automatically correct at least one of the detected one or more possible code misuse.

14. The computer system of claim 1, the computer system further caused to:
re-featurize the client codebase in response to an event.

15. The computer system of claim 14, wherein the event is a change of the client codebase.

16. The computer system of claim 14, wherein the event is a change of at least one of the one or more custom machine learning models.

17. A method for extracting data features from a client codebase for creation of custom models in a service, the method comprising:
communicating via a computer network with a client system that has access to a client codebase;
causing the client system to extract a set of features from the client codebase, extracting the set of features comprising:
compiling the client codebase;
building a semantic model based on the compiled client codebase; and
analyzing the semantic model to obtain the set of features;
selecting one or more features from the set of features based on one or more rules defined by a client associated with the client codebase;
receiving at least one of the extracted features from the client system via the computer network;
based on the received features, building one or more custom machine learning models that are tailored to the client codebase, such that the one or more custom machine learning models are built without having to have direct access to the client codebase; and
sending the one or more custom machine learning models to the client system via the computer network.

18. The method of claim 17, wherein the semantic model is built using at least some metadata of the client codebase.

19. A hardware storage medium having stored thereon computer executable instructions that are structured to be executable by one or more processors of a computer system to thereby cause the computer system to:
communicate via a computer network with a client system that has access to a client codebase;
cause the client system to extract a set of features from the client codebase, extracting the set of features comprising:
compiling the client codebase;
building a semantic model based on the compiled client codebase; and
analyzing the semantic model to obtain the set of features;
select one or more features from the set of features based on one or more rules defined by a client associated with the client codebase;
receive at least one of the extracted features from the client system via the computer network;
based on the received features, build one or more custom machine learning models that are tailored to the client codebase, such that the one or more custom machine learning models are built without having to have direct access to the client codebase; and
send the one or more custom machine learning models to the client system via the computer network.

20. The hardware storage medium of claim 19, the selection of one or more features comprising:
accessing a set of applicable rules defined by the client associated with the client codebase; and
filtering the set of features based on the set of applicable rules defined by the client to extract the one or more features.

* * * * *